No. 645,584. Patented Mar. 20, 1900.
E. T. WILDSMITH.
BAKE OVEN.
(Application filed Dec. 16, 1899.)
(No Model.)
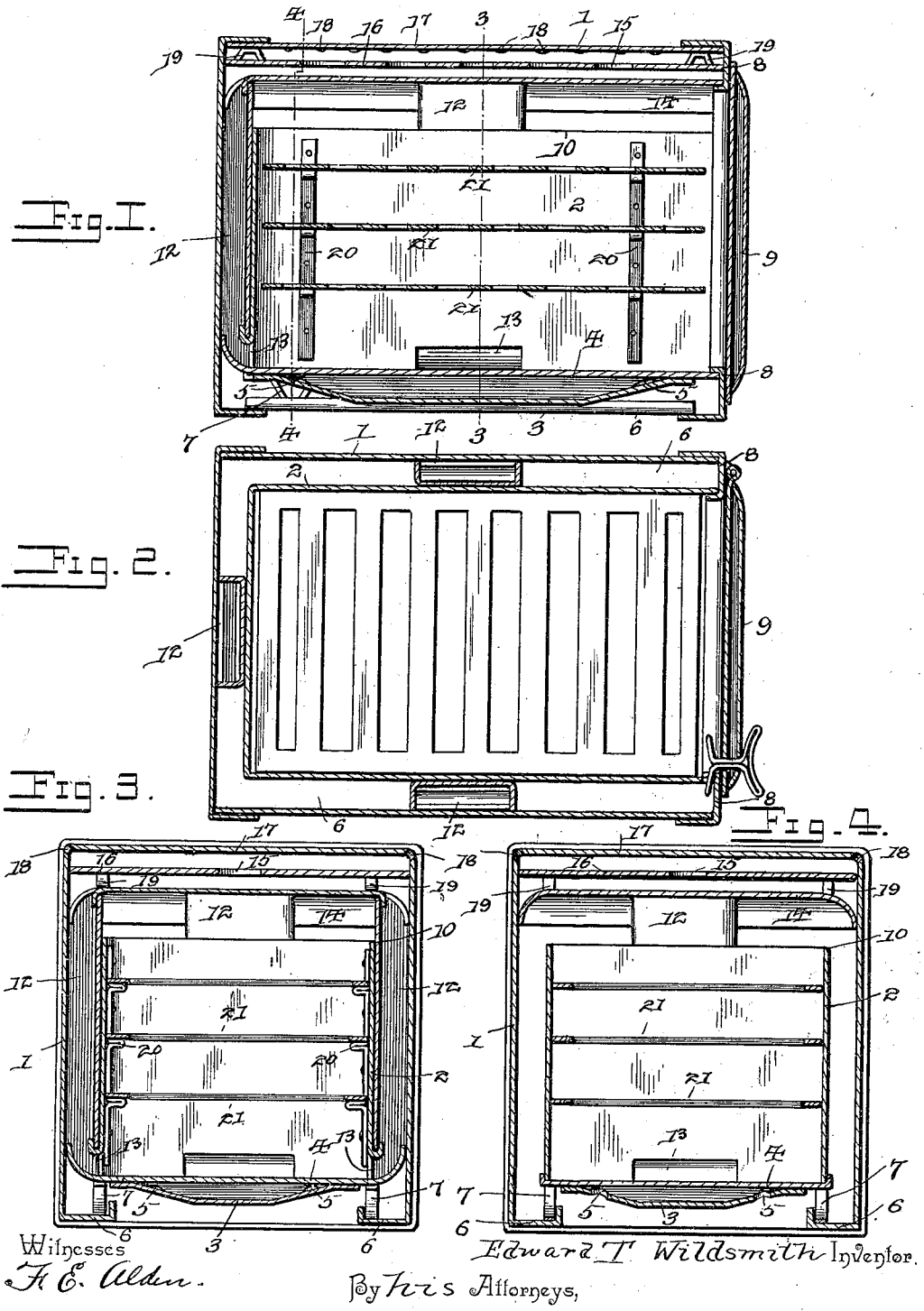
Witnesses
F. E. Alden.
J. H. Riley
Edward T. Wildsmith, Inventor.
By his Attorneys,

UNITED STATES PATENT OFFICE.

EDWARD TAYLOR WILDSMITH, OF BIRMINGHAM, ALABAMA.

BAKE-OVEN.

SPECIFICATION forming part of Letters Patent No. 645,584, dated March 20, 1900.

Application filed December 16, 1899. Serial No. 740,595. (No model.)

*To all whom it may concern:*

Be it known that I, EDWARD TAYLOR WILDSMITH, a citizen of the United States, residing at Birmingham, in the county of Jefferson and State of Alabama, have invented a new and useful Bake-Oven, of which the following is a specification.

The invention relates to improvements in bake-ovens.

The object of the present invention is to improve the construction of bake-ovens and to provide a simple, inexpensive, and efficient one designed for use on a gas, gasolene, or oil stove or analogous heating apparatus and adapted to convey the heat upward at all sides of it before admitting the same to its interior and to direct it downward from its top portion, whereby the heat is more evenly distributed and enables it to bake more evenly at the top and bottom.

The invention consists in the construction and novel combination and arrangement of parts hereinafter fully described, illustrated in the accompanying drawings, and pointed out in the claims hereto appended.

In the drawings, Figure 1 is a longitudinal sectional view of an oven constructed in accordance with this invention. Fig. 2 is a horizontal sectional view. Fig. 3 is a transverse sectional view on line 3 3 of Fig. 1. Fig. 4 is a similar view on line 4 4 of Fig. 1.

Like numerals of reference designate corresponding parts in all the figures of the drawings.

1 designates an outer casing receiving an inner casing 2 and having an open bottom to permit the flame of a gas, oil, or gasolene stove to impinge against a diaphragm 3 of the bottom 4 of the inner casing 2, whereby air is heated to a high degree before it passes upward between the inner and outer casings, as hereinafter described. The bottom diaphragm 3, which is arranged on the lower face of the bottom 4 of the inner casing, is bowed downwardly, as clearly illustrated in Figs. 1, 3, and 4 of the accompanying drawings, and it is provided at its corners with openings 5 for the escape of hot air. The outer casing, which may be constructed of any suitable material and which may be made ornamental or otherwise, is provided at the lower edges of its sides and ends with inwardly-extending approximately L-shaped flanges 6, forming horizontal supports or ledges for brackets 7, which are secured to the rear portion of the inner casing to support the same. The front portion of the inner casing, which is spaced from the outer casing, is secured to flanges 8, which extend inward from the outer casing around a door-opening and against which a hinged oven-door 9 abuts. The oven-door is provided with any suitable locking device for securing it in its closed position.

The hot air passes upward from the bottom of the oven at the sides and back of the same in the spaces between the inner and outer casings, and the inner casing has its upper edges 10 terminating short of the top of the oven to provide an entrance for hot air, which takes the course indicated by the arrows in the accompanying drawings. The hot air after passing downward in the inner casing or oven proper escapes therefrom at the bottom thereof by means of vertical flues 12, located in the intervening spaces between the inner and outer casings and communicating at their lower ends with the inner casing at the bottom thereof through openings 13 in the walls of the same. The intervening spaces between the inner and outer casings are divided into separate flues or passages by the flues 12. These flues, which may be constructed in any suitable manner, deliver the hot air to the top of the oven at the sides and back of the same, and the said hot air passes over the top wall or plate 14 to the center thereof and passes upward through central openings 15 of a horizontal partition 16, which is interposed between the top wall or plate 14 and the top 17 of the outer casing. The outer casing is provided at its top with openings 18 for the escape of the hot air. By this construction the air, which is heated to a high degree at the bottom of the oven, passes upward through the intervening spaces between the inner and outer casings before it enters the oven proper, and it is evenly distributed through the same in passing downward from the top of the inner casing to the openings 13 at the bottom thereof. The hot air, after leaving the bottom of the oven, is again conveyed to the top of the same and is caused to traverse such top portion from the sides to the center and back again before it leaves the oven. By this tortuous passage of the hot air a maximum effect of the same is obtained, and the oven is uniformly heated and is enabled to bake evenly at the top and bottom.

The horizontal partition or plate 16 is secured to the top of the outer casing by suitable brackets or supports 19, and the openings 15 are arranged in a longitudinal series, as clearly illustrated in Fig. 1 of the accompanying drawings. The oven is provided at opposite sides of the inner faces of the side walls of the inner casing with suitable supports 20 for the reception of shelves or trays 21 for supporting the articles to be cooked.

It will be seen that the oven is simple and comparatively inexpensive in construction, that it is adapted to utilize the hot air to a maximum extent, and that it is uniformly heated by the same and is enabled to bake evenly at the top and bottom.

What is claimed is—

1. An oven comprising an outer casing open at its bottom and provided at its top with openings, an inner casing spaced from the outer casing and having its upper edges terminating short of the top of the same to provide entrances for hot air, a horizontal top or plate 14 located above the inner faces, and the separate flues located in the intervening spaces between the inner and outer casings, and dividing the said spaces into independent flues or passages and communicating at their lower ends with the interior of the inner casing at the bottom thereof and having their upper ends communicating with the space above the top or plate 14, substantially as described.

2. An oven comprising an outer casing open at the bottom an inner casing spaced from the outer casing and terminating short of the top of the same and provided at its bottom with openings, a horizontal top or plate 14 located above the inner casing, a horizontal partition interposed between the top or plate 14, and the top of the outer casing and provided with central openings, and flues located in the intervening spaces between the casings and dividing the said spaces into independent flues or passages and extending upward from the openings at the bottom of the inner casing to the space above the horizontal top or plate, substantially as described.

3. An oven comprising an outer casing provided at its bottom with inwardly-extending flanges, an inner casing spaced from the outer casing and having its upper edges terminating short of the top of the same, a bottom diaphragm secured to the lower face of the bottom of the inner casing, and provided with corner-openings, the horizontal top wall or plate 14, located above the inner casing, and the flues extending upward from the bottom of the inner casing to the top wall or plate 14, and dividing the spaces between the inner and outer casings into separate flues or passages, substantially as described.

4. An oven having its side and rear walls each provided with a plurality of separate and independent flues or passages, extending from the top to the bottom of the oven and arranged to convey hot air from the heating apparatus to the top of the oven, and adapted to carry the hot air from the oven at the bottom of the same to the top thereof and discharge it thereat, substantially as described.

5. An oven having its side and back walls each provided with a plurality of separate and independent flues or passages, one set being arranged to convey hot air from the heating apparatus to the top of the oven and deliver it into the latter at that point, the other set being arranged to carry the air from the oven at the bottom thereof to the top of the same and discharge it at such point, substantially as described.

In testimony that I claim the foregoing as my own I have hereto affixed my signature in the presence of two witnesses.

EDWARD TAYLOR WILDSMITH.

Witnesses:
R. F. LEWIS,
U. L. TATE.